United States Patent Office 3,046,264
Patented July 24, 1962

3,046,264
OLEFIN POLYMERIZATION PROCESS
Erik Tornqvist, Westfield, and Arthur W. Langer, Jr., Watchung, N.J., assignors to Esso Research and Engineering Company, a corporation of Delaware
No Drawing. Filed Apr. 1, 1958, Ser. No. 725,507
2 Claims. (Cl. 260—93.7)

This invention relates to a process for preparing polymers of propylene or higher alpha olefins. More particularly, this invention relates to the low pressure preparation of polymers of propylene or higher alpha olefins using a preformed crystalline catalyst.

This application is a continuation-in-part of U.S. Serial No. 578,198, filed April 16, 1956.

The low pressure polymerization of alpha olefins with catalyst systems made up of reducible heavy transition metal compounds and a reducing metal-containing compound to high density, isotactic, relatively linear products has been assuming ever increasing importance and is now well known, see e.g. Belgian Patent 533,362, "Chemical and Engineering News," April 8, 1957, pages 12 through 16 and "Petroleum Refiner," December 1956, pages 191 through 196.

It was found prior to this invention that the polymerization of propylene or a higher alpha olefin is most effectively carried out with aliphatic diluents when using a catalyst system made up of a reducible heavy transition metal compound such as $TiCl_4$ and a reducing metal-containing compound, such as an alkyl aluminum compound. When aromatic diluents such as xylene were used in the polymerization reaction and/or the catalyst preparation, low yields of polyolefins were obtained. It was also discovered, prior to the present invention, that propylene or a higher alpha olefin can be polymerized at substantially atmospheric pressure using this catalyst system in an aliphatic diluent. However, no method of polymerizing propylene or a higher alpha olefin at substantially atmospheric pressure at high polymerization rates using a preformed catalyst system made up of an activated, preformed, crystalline, partially reduced heavy transition metal compound such as $AlEt_3$-activated $TiCl_3$ was known. This preformed catalyst system is desirable for obtaining sterically oriented polymers of olefins having more than 2 carbon atoms.

It has now been discovered that substantially atmospheric polymerization of propylene or higher alpha olefins can take place with an activated preformed catalyst system when the reaction is carried out in an aromatic diluent under carefully controlled conditions to produce superior polymers.

As an example of these superior polymers, the polypropylene prepared by the present process is believed to have physical properties superior to any polypropylene known to the art. In particular, the polypropylene of the invention is less than 15% soluble in n-heptane and has a tensile strength of over about 5000 p.s.i. Modifications of the present process have given polypropylene with a solubility in n-heptane of about 10% and a tensile strength of about 6000 p.s.i. Accordingly, it can be seen that this polypropylene is highly crystalline.

The alpha olefins useful in the present process include propylene and higher alpha olefins such as butene-1, heptene-1, dodecene-1 and the like, with propylene preferred. In general, alpha olefins having at least 3 carbon atoms, preferably 3 to 7 carbon atoms can be polymerized by the present process.

The catalysts employed herein are activated, partially reduced heavy transition metal compounds or activated, partially reduced heavy transition metal compounds co-crystallized with a group II or III metal compound. The group II or III metal compound is preferably a halide such as aluminum chloride, zinc chloride and the like. The partially reduced heavy transition metal compounds include inorganic compounds, such as the halides, oxyhalides, complex halides, oxides, and hydroxides, and organic compounds, such as alcoholates, acetates, benzoates, and acetonates of the transition metals of the IV, V, VI, and VIII groups of the periodic system e.g. titanium, zirconium, hafnium, thorium, uranium, vanadium, niobium, tantalum, chromium, molybdenum, tungsten and iron. The metal halides, particularly the chlorides, are generally preferred; especially purple crystalline titanium trichloride. Purple crystalline titanium trichloride co-crystallized with aluminum chloride is particularly preferred. When the catalyst is a partially reduced heavy transition metal compound cocrystallized with a group II or III metal compound, the catalyst contains from 0.05 to 1.0, preferably 0.1 to 0.5 mole of the group II or III metal compound per mole of partially reduced transition metal compound.

The partially reduced heavy transition metal compounds can be prepared by any procedure known to the art and the preparation of these compounds is not within the scope of the invention. However, some of the methods known for preparing the preferred catalysts of the invention, i.e. purple crystalline titanium trichloride and purple crystalline titanium trichloride co-crystallized with aluminum chloride are summarized below.

(1) Reduction of titanium tetrachloride with aluminum powder in xylene at 100–175° C. at atmospheric pressure.

(2) Metal reduction of titanium tetrachloride with aluminum powder, titanium powder, or mixtures of aluminum and titanium powder in the absence of solvent at elevated temperatures.

(3) Hydrogen reduction of titanium tetrachloride at temperatures above about 650° C.

(4) Reduction of titanium tetrachloride with metal alkyls, $AlEt_3$ in particular, in an inert diluent above about 130° C.

(5) Heating a mixture of titanium tetrachloride and an aluminum alkyl after the formation of a brown precipitate at a temperature above about 70° C. in the presence of an inert diluent.

(6) Reducing titanium tetrachloride with an aluminum trialkyl by carrying out the reduction in temperature graded stages in an inert diluent and with aluminum trialkyl/$TiCl_4$ mole ratio of about 0.33/1.

(7) Heat decomposition of $TiCl_4$ at above about 1000° C.

The above catalysts of the invention are activated with organo-metallic compounds, preferably organo-aluminum compounds, and especially aluminum alkyl compounds, such as alkyl aluminum halides and trialkyl aluminum, e.g. triethyl aluminum. Other organo-metallic compounds that can be used include dialkyl zinc, dialkyl magnesium, triaryl aluminum, and complexes such as lithium aluminum tetraalkyl. In general, from 0.1 to 5.0 moles of the activating organo-metallic compound per mole or partially reduced transition metal halide is added to the catalyst in an aromatic diluent.

The polymerization of propylene or a higher alpha olefin is carried out by diluting the activated catalyst solution with additional aromatic diluent, preferably to obtain a catalyst concentration of about 0.1 to 0.5 wt. percent based on the weight of diluent and then saturating the resulting dispersion with the alpha olefin to be polymerized at a temperature below about 50° C., preferably 0° to 30° C. Thereafter, the temperature is slowly raised at a rate not exceeding about 2° C. per minute to a final temperature of between about 60 to 120° C., preferably 70 to 100° C. while continuing the passage of alpha olefin into the dispersion, and maintaining this temperature for from 1 to 10 hours, depending on the rate of polymerization. A very slow rate of temperature increase is not harmful but results in an unnecessary long induction period during which little or no polymerization takes place. In general, therefore, a temperature increase of from about 0.5 to 2° C. per minute is maintained. During the above process the reaction mixture is preferably stirred. When the desired degree of polymerization has been obtained, a $C_1$ to $C_8$ alkanol such as isopropyl alcohol or n-butyl alcohol, desirably in combination with a chelating agent such as a 2,3- or 2,4-diketone, e.g. acetyl acetone, is added to the reaction mixture to dissolve and deactivate the catalyst and precipitate the polymer from solution. After filtration, or other physical removal of the polymer from solution, the polymer can be further washed with alcohol or an acid such as hydrochloric acid, dried, compacted, and packaged.

It is to be noted that the procedure given above is critical with respect to the initial temperature at which the alpha olefin is added to the catalyst dispersion, and the rate of temperature increase employed thereafter. If the alpha olefin is added to the catalyst slurry at polymerization temperatures, very severe catalyst fouling occurs. Likewise, if the rate of temperature increase is too rapid, severe catalyst fouling also takes place. By catalyst fouling is meant the formation of a flocky or stringy catalyst which when used in the polymerization reaction results in poor polymer yields and in the formation of polymers having poor physical properties.

The aromatic diluents useful in the present process are aromatic hydrocarbon diluents such as benzene, toluene, xylene and the like. Also, mixtures of these diluents can be used. However, xylene is superior to any of the other aromatic diluents in that higher rates of polymerization are obtained therewith. Accordingly xylene is not equivalent to other aromatic diluents although the use of other aromatic diluents is within the broader scope of the invention. Aliphatic diluents cannot be used advantageously in the process since their use results in poorer polymer yields and frequently also in agglomeration of the catalyst and in severe polymer coating of the catalyst so that very little catalyst activity is obtained thereby.

The invention will be better understood by reference to the following examples.

EXAMPLE I 1.54 g. of a violet crystalline $TiCl_3$ catalyst prepared by the hydrogen reduction of $TiCl_4$ at the surface of a platinum filament at 700° C. was added to 100 ml. of xylene in a 2-liter stirred glass reaction flask. Then 2.24 g. of $AlEt_3$ was added and the resulting mixture stirred for 30 minutes at 25° C. Thereafter, 400 ml. of xylene was added to the mixture and gaseous propylene introduced at a rate of about 1000 ml. per minute. The temperature was then increased at a rate of about 1° C. per minute until a temperature of about 78° C. was reached. The temperature was then maintained in the range of 78-80° C. for about 1.5 hours. During this time, introduction of propylene was continued at the rate of about 1000 ml. per minute. After the polymerization reaction was completed, 500 cc. of isopropyl alcohol was added to the stirred mixture to decompose the catalyst and precipitate the polymer, the resulting mixture was stirred at 70° C. for 10 minutes, the solid polymer was filtered off at 50° C., washed with 500 cc. of hot isopropyl alcohol, and dried in vacuum. The catalyst preparation, polymerization reaction conditions and the properties of the polypropylene obtained are given in Table I.

EXAMPLES II THROUGH IV

Propylene was polymerized using the process of Example I except that the catalyst in Example II was $TiCl_3 \cdot 0.2AlCl_3$, in Example III was $TiCl_3 \cdot 0.33AlCl_3$, and in Example IV was $TiCl_{2.8} \cdot 0.24AlCl_3$. Also, toluene was used as the diluent in Example IV. The catalyst preparation conditions, polymerization reaction conditions and the properties of the polypropylenes obtained are shown in Table I.

Examples V through VIII following illustrate the results obtained when certain variations in the process are adopted. The details therefore are given in Table I for comparison purposes.

EXAMPLE V

Propylene was polymerized according to the process of Example II except that propylene was not introduced into the activated catalyst-xylene dispersion until the dispersion was heated to 55° C. The temperature was then increased at a rate of 2° C. per minute until the temperature of about 99° C. was obtained. As can be seen from Table I, only 13 g. of polymer containing 8.3% of waxy polymer was obtained. Additionally, only a low catalyst efficiency was obtained due to severe catalyst fouling.

EXAMPLE VI

Propylene was polymerized according to the process of Example II except that the triethyl aluminum activator was not added to the propylene saturated $TiCl_3 \cdot 0.2AlCl_3$-xylene slurry until the temperature was 74° C. Severe catalyst fouling took place resulting in a yield of solid polymer of only 15 g. and a very low catalyst efficiency. Additionally, the polymer formed had a very low molecular weight.

EXAMPLE VII

Propylene was polymerized according to the process of Example II except that the temperature of the reaction mixture was raised at a rate of about 2.8° C. per minute. This relatively rapid temperature increase resulted in catalyst agglomeration and a decreased polymer yield.

EXAMPLE VIII

Propylene was polymerized according to the process of Example II except that the activated catalyst was added to the propylene saturated xylene at 95° C. A very low polymerization rate was obtained and accordingly the experiment was terminated after 15 minutes. No polymer was recovered.

The following Examples IX through XI illustrate the use of diluents other than xylene in the present process. The catalyst preparation conditions, polymerization reaction conditions and the properties of the polypropylenes obtained are given in Table I.

EXAMPLE IX

Propylene was polymerized according to the process of Example I except that toluene was used as the reaction diluent. The yield of polymer, the catalyst efficiency obtained and the tensile strength obtained, while all good, were less than those of the process of Example I. However, it can be seen that toluene is nevertheless operable as a diluent in the process, and accordingly this example illustrates the broader scope of the invention which relates to the use of aromatic diluents in general.

EXAMPLES X AND XI

Propylene was polymerized according to the process of Example I except that in Example X n-heptane was used as a diluent and in Example XI n-decane was used as a diluent. In both of these examples the yield of solid polymer, the catalyst efficiency, and the tensile strength of the polymers obtained were all markedly less than in Example I. Additionally, a higher percentage of waxy polymer was obtained in both Examples X and XI.

The following Examples XII and XIV show that catalyst systems made up of a reducible heavy transition metal compound and a reducing metal containing compound cannot be used successfully in the present process either in an aromatic or aliphatic diluent. The conditions of preparation and polypropylene properties obtained are given in Table I for comparison purposes.

EXAMPLE XII

Propylene was polymerized according to the process of Example I using a $TiCl_4 \cdot 2AlEt_3$ catalyst mixture in xylene diluent. An extremely low yield of solid polymer and catalyst efficiency as well as a relatively high percentage yield of waxy polymer was obtained.

EXAMPLE XXIII

Propylene was polymerized according to the process of Example I except that a $TiCl_4 \cdot 2AlEt_3$ catalyst mixture was used in an n-decane diluent. Polypropylene having low softening and melting point and a low tensile strength was obtained as compared to the polypropylene of Example I.

EXAMPLE XIV

Propylene was polymerized according to the process of Example I except that a $TiCl_4 \cdot 2AlEt_3$ catalyst mixture was used in an n-heptane diluent. Polypropylene having a low molecular weight was obtained.

*Table I*

|  | Ex. I | Ex. II | Ex. III | Ex. VI | Ex. V |
|---|---|---|---|---|---|
| Diluent | xylene | xylene | xylene | toluene | xylene. |
| Catalyst: | | | | | |
| Titanium chloride— | | | | | |
| Type | $TiCl_3$ | $TiCl_3 \cdot 0.2AlCl_3$ | $TiCl_3 \cdot 0.33AlCl_3$ | $TiCl_{2.8} \cdot 0.24AlCl_3$ | $TiCl_3 \cdot 0.2AlCl_3$. |
| Weight, g | 1.54 | 1.81 | 1.0 | 1.74 | 0.91. |
| AlEt$_3$, g | 2.24 | 2.28 | 1.52 | 3.14 | 1.14. |
| Mixing Temp., ° C | 25 | 26 | 26 | 26 | 28. |
| Time, Minutes | 30 | 40 | 30 | 40 | 30. |
| Catalyst Conc., g./l | 26.4 | 40.9 | 19.5 | 40.9 | 17.1 |
| Al/Ti mole ratio¹ | 2 | 2 | 1.67 | 3 | 2. |
| Reaction Conditions: | | | | | |
| Vol., l | 0.5 | 0.34 | 0.4 | 0.35 | 0.5. |
| Starting Temp., ° C | 25 | 25 | 27 | 25 | 55. |
| Polymerization Temp. Range, ° C | 50–80 | 60–102 | 60–80 | 60–80 | 96–101. |
| Polymerization time, hours | 1.75 | 4.0 | 1.75 | 1.5 | 2.0. |
| Catalyst Conc., g./l | 7.6 | 4.2 | 3.8 | 9.8 | 3.94. |
| Max. absorption rate, ml./g./min | 139 | 208 | 160 | 108 | 49. |
| Yield, g | 49.5 | 253 | 67.4 | 51.0 | 13. |
| Waxy polymer, percent | 2.2 | 4.3 | 9.5 | 7.8 | 8.3. |
| Catalyst efficiency, g./g | 13.0 | 61.9 | 26.8 | 8.4 | 6.1. |
| Properties of Solid Polymer: | | | | | |
| Molecular wt. $\times 10^{-3}$ | 134 | 140 | 170 | 122 | 27. |
| Heptane insolubles, percent | | 89.2 | 89.6 | | |
| Density, g./ml | 0.904 | 0.900 | 0.903 | 0.905 | |
| Softening Point, ° C | 155 | 158 | 165 | 160 | |
| Melting Point, ° C | 165 | 165 | 170 | 163 | |
| Tensile strength, p.s.i | 5,770 | 5,430 | 5,350 | 5,280 | |
| Elongation, percent | 0 | 10 | 60 | 30 | |

|  | Ex. VI | Ex. VII | Ex. VIII | Ex. IX | Ex. X |
|---|---|---|---|---|---|
| Diluent | xylene | xylene | xylene | toluene | n-heptane. |
| Catalyst: | | | | | |
| Titanium chloride— | | | | | |
| Type | $TiCl_3 \cdot 0.2AlCl_3$ | $TiCl_3 \cdot 0.2AlCl_3$ | $TiCl_3 \cdot 0.2AlCl_3$ | $TiCl_3$ | $TiCl_3$. |
| Weight, g | 0.91 | 0.91 | 0.91 | 1.54 | 1.54. |
| AlEt$_3$, g | 1.14 | 1.14 | 1.14 | 2.28 | 2.28. |
| Mixing Temp., ° C | 26 | 26 | 70 | 25 | 25. |
| Time, Minutes | 60 | 60 | 60 | 30 | 30. |
| Catalyst Conc., g./l | 1.8 | 41 | 14.8 | 26.4 | 26.4. |
| Al/Ti mole ratio¹ | 2 | 2 | 2 | 2 | 2. |
| Reaction Conditions: | | | | | |
| Vol., l | 0.5 | 0.5 | 0.5 | 0.5 | 0.5. |
| Starting Temp., ° C | 74 | 26 | 95 | 25 | 25. |
| Polymerization Temp. Range, ° C | 74–106 | 83–107 | 95–98 | 60–82 | 60–81. |
| Polymerization time, hours | 2.0 | 2.0 | 0.25 | 1.7 | 1.7. |
| Catalyst Conc., g./l | 4.1 | 4.1 | 4.1 | 7.6 | 7.6. |
| Max. absorption rate, ml./g./min | 73 | 83 | 44 | 93 | 73. |
| Yield, g | 15 | 41 | | 40.7 | 26.2. |
| Waxy polymer, percent | 3.5 | 10 | | 2.5 | 3.8. |
| Catalyst efficiency, g./g | 7 | 20 | | 10.6 | 6.9. |
| Properties of Solid Polymer: | | | | | |
| Molecular wt. $\times 10^{-3}$ | 2.5 | 122 | | 108 | 112. |
| Heptane insolubles, percent | | 86.9 | | | |
| Density, g./ml | | | | 0.903 | 0.904. |
| Softening Point, ° C | | | | 160 | 152. |
| Melting Point, ° C | | | | 164 | 155. |
| Tensile strength, p.s.i | | | | 5,440 | 4,730. |
| Elongation, percent | | | | 20 | 30. |

¹ Calculated on Al in AlEt$_3$ only.

*Table I — Continued*

|  | Ex. XI | Ex. XII | Ex. XIII | Ex. XIV |
|---|---|---|---|---|
| Diluent | n-decane | xylene | n-decane | n-heptane. |
| Catalyst: |  |  |  |  |
|   Titanium chloride— |  |  |  |  |
|     Type | $TiCl_3$ | $TiCl_4$ | $TiCl_4$ | $TiCl_4$. |
|     Weight, g | 1.54 | 1.6 | 1.6 | 1.6. |
|   $AlEt_3$, g | 2.28 | 2.0 | 2.0 | 2.0. |
| Mixing Temp., °C | 25 | 25 | 25 | 25. |
|   Time, Minutes | 30 | 60 | 60 | 60. |
|   Catalyst Conc., g./l | 26.4 | 36 | 36 | 36. |
|   Al/Ti mole ratio [1] | 2 | 2 | 2 | 2. |
| Reaction Conditions: |  |  |  |  |
|   Vol., l | 0.5 | 0.5 | 0.5 | 0.5. |
|   Starting Temp., °C | 25 | 11 | 10 | 11. |
|   Polymerization Temp. Range, °C | 60–80 | 55–63 | 10–30 | 30–62. |
|   Polymerization time, hours | 1.75 | 1.5 | 2 | 1.8. |
|   Catalyst Conc., g./l | 7.6 | 7.2 | 7.2 | 5.0. |
|   Max. absorption rate, ml./g./min | 102 | 17 | 125 | 120. |
|   Yield, g | 37.1 | 4.9 | 74.3 | 50. |
|   Waxy polymer, percent | 4.9 | 8.2 | 18.2 | 12.8. |
|   Catalyst efficiency, g./g | 9.7 | 1.4 | 19.8 | 14.0. |
| Properties of Solid Polymer: |  |  |  |  |
|   Molecular wt. × $10^{-3}$ | 142 | 113 | 117 | 54. |
|   Heptane insolubles, percent |  |  |  |  |
|   Density, g./ml | 0.902 |  | 0.876 |  |
|   Softening Point, °C | 150 |  | 123 |  |
|   Melting Point, °C | 158 |  | 143 |  |
|   Tensile strength, p.s.i | 4,860 |  | 1,800 |  |
|   Elongation, percent | 40 |  | 910 |  |

[1] Calculated on Al in $AlEt_3$ only.

It can be seen from Table I that the polymers of Examples I, II, III, IV and IX, the polymers of the invention, have very high tensile strengths. Additionally, they were found to be highly crystalline from X-ray diffraction studies. Also, the processes of these examples show good yields and catalyst efficiencies and a relatively low percentage of waxy polymer by-product.

It is to be understood that the invention is not limited to the specific examples which have been given by way of illustration purposes only and that modifications herein can be made without departing from the scope and spirit of the invention.

What is claimed is:

1. The process for forming a high crystallinity polymer from propylene comprising the steps of passing said olefin into an aromatic hydrocarbon diluent containing from 0.1 to 0.5 wt. percent of a catalyst of a cocrystallized titanium trichloride-aluminum chloride activated with from 0.1 to 5.0 mols of a trialkyl aluminum compound, at a temperature in the range of 10 to 50° C., and at substantially atmospheric pressure, increasing said temperature at a rate not greater than 2° C. per minute until a polymerization temperature in the range of 60° to 120° C. is obtained while continuing the passage of said olefin into said aromatic diluent, maintaining the polymerization temperature to polymerize propylene, and isolating said high crystallinity polymer therefrom.

2. The process of claim 1 wherein the aromatic diluent is xylene.

References Cited in the file of this patent

UNITED STATES PATENTS

| 2,824,090 | Edwards et al. | Feb. 18, 1958 |
| 2,882,263 | Natta et al. | Apr. 14, 1959 |
| 2,893,984 | Seelbach et al. | July 7, 1959 |
| 2,898,329 | Kittleson | Aug. 4, 1959 |

FOREIGN PATENTS

| 787,438 | Great Britain | Dec. 11, 1957 |
| 538,782 | Belgium | Dec. 6, 1955 |